United States Patent
Creasey

[11] 3,814,160
[45] June 4, 1974

[54] TREAD WEAR INDICATOR

[75] Inventor: Jack R. Creasey, Akron, Ohio

[73] Assignee: PPG Industries, Inc., Pittsburgh, Pa.

[22] Filed: Sept. 18, 1972

[21] Appl. No.: 289,924

[52] U.S. Cl. .............................. 152/330, 152/209
[51] Int. Cl. ................................................ B60c 5/00
[58] Field of Search .............. 152/209, 330, 330 A; 260/448.8

[56] References Cited
UNITED STATES PATENTS
3,261,388 7/1966 Kovac ........................ 152/330 A
3,664,403 5/1972 Doran ............................ 152/330

*Primary Examiner*—Drayton E. Hoffman
*Attorney, Agent, or Firm*—Irwin M. Stein

[57] ABSTRACT

Tires having a tread wear indicator are provided wherein the tread has a surface portion of a first color and an interior sub-surface tread wear indicator portion of a contrasting color. The tread has the same desirable wearing properties as carbon reinforced tire treads but at least one of the portions contains a reinforcing siliceous pigment and preferably essentially all of the reinforcing pigment is siliceous pigment.

12 Claims, 1 Drawing Figure

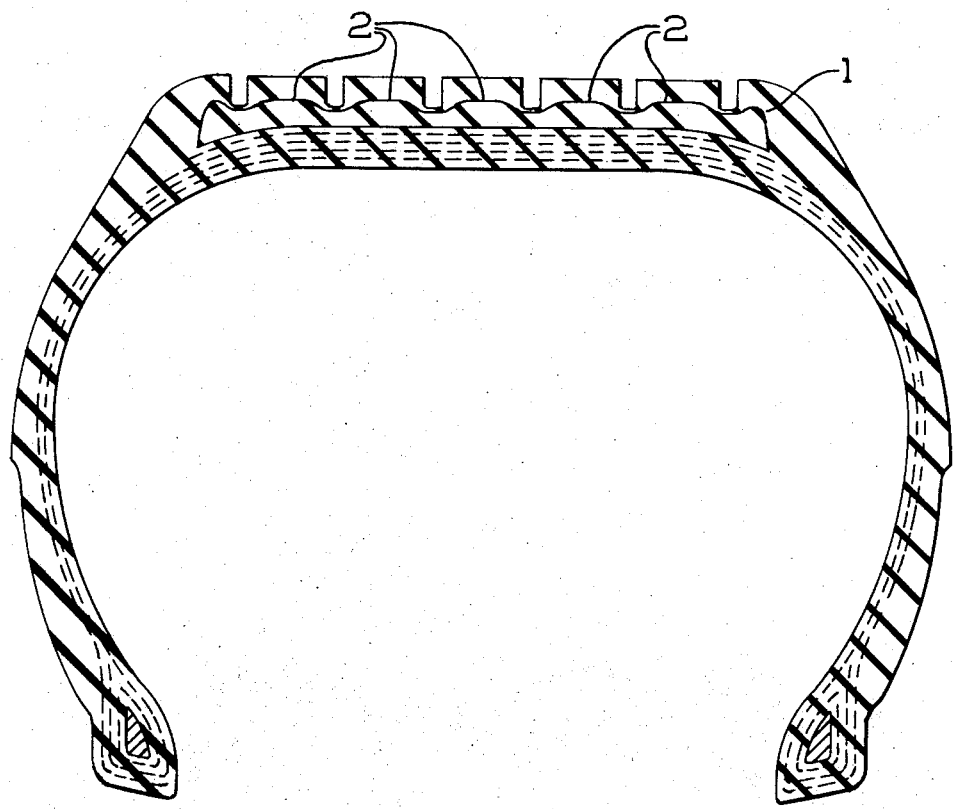

TREAD WEAR INDICATOR

This invention relates to tires having a tread wear indicator and more particularly to tires having a tread with a surface portion of one color and an interior tread wear indicator sub-surface portion of a contrasting color wherein at least one of said portions is formed at least in part from a reinforcing siliceous pigment, a curable rubber, and preferably a particular coupling agent.

The concept of forming a tire with a surface portion of one color and an interior sub-surface portion of a contrasting color to serve as an indicator of when the tread has exhausted its useful life is not new. For example, U.S. Pat. No. 3,516,467 to Sims and U.S. Pat. No. 2,285,929 to Jacobson are illustrative. Another solution, i.e., the use of colored fibers is suggested by Kovac et al., U.S. Pat. No. 3,261,388. To applicant's knowledge, however, the concept of employing a tread having a sub-surface portion of rubber having a color contrasting with the surface portion had not been commercially feasible because it was not possible to prepare a rubber having a color other than black yet still having the same desirable properties of carbon black reinforced rubbers. See, for example, the aforesaid patent to Kovac et al., column 1, lines 33 through 37, wherein the following is stated: "However, it has been impossible to compound a rubber composition which contrasts with the color of carbon black reinforced stocks and still have the same physical characteristics of carbon black reinforced stock." See also the February, 1972, issue of Modern Tire Dealer, wherein a Dunlop tire officer replied to the statement that the German ministry of transport intended to introduce colored indicators to show the degree of tread wear. It must be clear even to a layman that it is impossible to make tires that blush (that is, show a colored area of tread) when they reach the stage of contravening police regulations. "If it were possible to obtain the same quality of tires by adding color mixtures instead of carbon black, then we would have had 'pop tires' ages ago."

SUMMARY OF THE INVENTION

The present invention relates to a tire having a carcass and a tread portion secured to the carcass. The tread portion of the tire has a plurality of tread grooves and comprises a surface portion of a first color and a sub-surface portion of a contrasting color which is at least 1/16 inch above the bottom of the tread groove. One of the surface and sub-surface portions of the tread is carbon black-reinforced rubber and the other comprises the vulcanizate of reinforcing siliceous pigment, curable rubber and coupling agent which serves to bind the siliceous pigment to the curable rubber. Exemplary of curable rubbers are styrene-butadiene rubber, butadiene rubber, ethylene-propylene-diene rubber (EPDM) and natural rubber. Exemplary of the coupling agent are trialkoxysilyl olefins, mercaptoalkylated polyamines and mercaptoalkyl trialkoxysilanes.

BRIEF DESCRIPTION OF THE DRAWING

The drawing is a cross-section of a tire illustrating the placement of a tread wear indicator in the tread.

DETAILED DESCRIPTION

It has now been discovered that tires having tread wear indicators can be prepared in which the sub-surface portion of the tread has a color contrasting to the surface portion and quite unexpectedly the rubbers both have the same desirable properties possessed by carbon black reinforced rubbers. More particularly, it has been found that rubbers containing a major portion of siliceous finely divided pigment and preferably a particular crosslinking agent can be made having a white, yellow, or other color contrasting to black by the incorporation of suitable pigment or a white rubber can be prepared by simply employing siliceous pigment as the sole reinforcing material. Moreover, these siliceous pigment-filled rubbers in some cases have properties superior to carbon black-filled compositions. Generally the outer layer of the tread exposed to the road will be black and the tread wear indicator portion will be of a light color, e.g., white. If desired, however, the outer layer can be of a light color and the tread wear indicator portion of a dark color.

A preferred embodiment of the invention is illustrated in the drawing which is a cross-section of a tire. The tread portion exposed to the road is black and the tread wear indicator, white. The tread wear indicator 1 is a constant distance from the tread surface between each rib at point 2. A rib is the portion between adjacent tread grooves. The tread wear indicator portion is not equidistant to the outer surface of the tread at all points because the molding of the tread design causes the tread wear indicator rubber to be partially displaced immediately below the tread groove.

The siliceous pigments preferably employed in this invention are precipitated, hydrated silica and are obtained by the precipitation of a soluble silicate, for example, silica, produced according to the method described in U.S. Pat. No. 2,940,830. These pigments have an $SiO_2$ content of at least 50 percent and usually greater than 80 percent by weight on an anhydrous basis. The siliceous pigment should have an ultimate particle size in a range of 50 to 1,000 angstroms, preferably between 50 and 400 and, more preferably, between 150 and 300 angstroms. The BET surface of the pigment as measured using nitrogen gas is preferably in the range of 50 to 600, usually 70 to 300 square meters per gram. The BET method of measuring surface area is described in the Journal of the American Chemical Society, Vol. 60, page 304 (1930). A typical commercial form of such reinforcing siliceous pigment is manufactured and sold by PPG Industries, Inc., under the trademark "Hi-Sil 233."

Other siliceous pigments can be employed, however, such as pyrogenic silicas having the same particle size such as, for example, "Cab-O-Sil" manufactured by Cabot Corporation.

The rubber can be of any of the commonly employed types such as, for example, natural or synthetic rubbers such as silicone rubber, chloroprene rubber, butadiene rubber, isoprene rubber, (EPDM), and styrene-butadiene rubber. While the above list illustrates a number of rubbers which can be employed, it is not meant to be all inclusive as one skilled in the art will appreciate a number of other rubbers can be employed. The particular rubber selected will depend upon its intended use as well as the coupling agent and other rubber ingredients employed. Preferably, however, the rubber is one of the conventional types used in tires such as styrene-butadiene rubber, butadiene rubber, ethylene-propylene diene rubber and natural rubber.

Furthermore, the rubber compounds may contain any of the various additives conventionally included in rubber compounds such as accelerators (e.g., guanidines), activators (e.g., zinc oxide), oil extenders (e.g., a mixture of 76 percent aromatic hydrocarbons and 26 percent naphthenic hydrocarbons manufactured and sold by Sun Oil Company under the trademark "Sundex 53"), curatives (e.g., sulfur), etc.

When white or light colored rubbers are prepared, however, it is preferable to use non-coloring processing oils and eliminate antioxidants or other compounds which degrade and discolor the rubber. Although rubbers formed from a siliceous pigment as the sole reinforcing pigment are of a light color, if desired a pigment such as titanium dioxide can be employed to improve the brightness. When light colors are desired, processing oils consisting essentially of naphthenic hydrocarbons should be employed rather than those consisting essentially of aromatic hydrocarbons.

For best results, it has been found that a coupling agent, i.e., a material that forms a connection or bond between the siliceous pigment and the rubber polymer is employed. Among the preferred coupling agents are those having a functional group capable of chemically or physically bonding to the rubber polymer. Preferred examples of said coupling agents are the trialkoxysilyl olefins such as, for example, 5-triethoxysilylnorbornene which coupling agents are illustrated by U.S. Pat. No. 3,664,403 and herein incorporated by reference.

Another preferred group of coupling agents contain at least one nitrogen functional group capable of bonding to the siliceous pigment and at least one sulfur functional group capable of bonding to the rubber polymer. Preferably, the nitrogen functional groups are selected from straight chain, primary, secondary, and tertiary amino groups and most preferably the coupling agent is a mercapto alkylated polyamine such as mercapto ethylated polyethylene imine.

Another and most preferred type of coupling agents contains a functional group that is capable of chemically or physically bonding to a silica particle such bond, for example, being between a silicon atom of the coupling agent and an oxygen atom of the silica particle and a functional group that is capable of chemically or physically bonding to the rubber polymer, said latter group capable of providing a sulfur that will bond with the rubber polymer. Preferred examples are the mercaptoalkyl trialkoxysilanes and particularly mercaptopropyl trimethoxysilane and mercaptopropyl triethoxysilane. This type of coupling agent is illustrated in Belguim Pat. No. 775,655 and herein incorporated by reference.

Unless otherwise indicated, the hereinafter-described ingredients will be stated as parts by weight. Furthermore, the formulations will be based on 100 parts of rubber. Typically, the rubber composition used in the tire treads of the present invention may include 100 parts of rubber, such as a styrene-butadiene rubber; 5 to 100 parts of silica (preferably 40 to 90 parts), such as "Hi-Sil 233" (trademark of PPG Industries, Inc.) reinforcing siliceous pigment; 0.1 to 15 parts coupling agent (preferably 0.3 to 3 parts), such as mercaptopropyl trimethoxy silane; and conventional sulfur or peroxide curatives. The sulfur curative may include 0.5 to 3 parts sulfur, 2 to 5 parts zinc oxide, and 0.5 to 2 parts accelerator. A peroxide curative may include 1 to 6 parts dicumyl peroxide, such as "Dicup 40C" (trademark of Hercules Powder Compahy, Inc.). Although not essential, other conventional rubber additives are not detrimental. Other conventional rubber additives would include carbon blacks when a white or light color is not desired, oils, plasticizers, antioxidants, and colors.

The coupling agent can be added in any of several stages of rubber compounding. For example, satisfactory rubber compositions can be obtained when the coupling agent is reacted with the silica prior to incorporating the silica into the rubber batch such as by coating the silica with the coupling agent. Satisfactory rubber compositions can also be obtained when the coupling agent is incorporated into a co-precipitated silica latex masterbatch. The coupling agent can be reacted with the rubber prior to incorporation of the silica therein or it can be added to the rubber batch together with silica and various other additives during the Banbury mixing. The coupling agent may be in any one of several forms when it is reacted with the rubber or silica; for example, it may be in the vapor state. Alternatively, it can be added in a substantially pure state, dissolved in an organic solvent, or dissolved or suspended in water.

Preferably, the coupling agent is permitted to react with the silica and the rubber prior to the incorporation of any of the polar additives, particularly soaps, metal oxides (especially zinc oxide), amines, glycols, and accelerators (especially guanidine) into the rubber batch.

The tires of the invention can be made by conventional means such as, for example, several rubber plies can be laid on top of one another on to a tire carcass and one or more plies of a contrasting color to that of the surface ply placed near or at the bottom of the tread plies in order to be exposed when the tread is abraded and its useful life nearly gone. Preferably, the tire treads are made by simultaneously extruding two rubbers — one of a contrasting color. This can be accomplished by the use of the dual-head tuber. Alternatively, a dual-head tuber could be employed to extrude a single compound for both tread and black sidewall which could be simultaneously extruded with a white indicator compound. Other methods may be employed, however, to incorporate the indicator into the tread section of the tire.

The tread wear indicator portion should be at least 1/16th of an inch above the bottom of the tread groove up to about 3/32nds of an inch above the bottom of said groove. In addition, the tread wear indicator portion should be between about 2 and about 5/16ths of an inch thick so as to permit a motorist to drive for an extended period after the tread wear indicator portion is first visible so that it will be discovered by the motorist or gas station attendant before the tire is sufficiently worn to become hazardous. If desired, a plurality of contrasting tread wear indicators can be employed indicating varing degrees of wear, the last or most submerged portion indicating that the tire should be replaced immediately. In most cases, it is not essential that the tread wear indicator portion extend the complete width of the tire tread but it is preferred inasmuch as the tire may wear unevenly so as to become unsafe in one portion whereas the remainder of the tread may be barely worn.

The following examples illustrate specific rubber formulations which can be employed in the preparation of tires of the invention and a method for preparing a tire having a tread wear indicator. All parts and percentages in said examples and elsewhere in the specification and claims are by weight unless otherwise indicated.

EXAMPLE 1

A white rubber compound was prepared employing a finely divided siliceous pigment as the reinforcing pigment and compared with a commercial black tread rubber by the conventional rubber test. The compound I-A was prepared from the ingredients listed in the following Table I wherein the first six ingredients were mixed in a Banbury for 5 minutes at between 300° and 320° F. and the last four ingredients indicated by the asterisk were added during mixing on a rubber mill and the mixing continued on the mill for about 10 minutes at 180° F.

TABLE I

| Compound No. | I-A | I-B |
|---|---|---|
| (Ingredients): | | |
| SBR-1502 [1] | 98 | Seiberling "Wide Oval" Commercial Tread Rubber. |
| Hi-Sil 233 [2] | 60 | Do. |
| $TiO_2$ | 5 | Do. |
| Stearic acid | 1 | Do. |
| Tufflo 6204 [3] | 10 | Do. |
| Mercaptopropyl trimethoxy silane. | 1.5 | Do. |
| 2,2'-Benzothiaozle disulfide* | 1.2 | Do. |
| Di-ortho-tolyguanidine* | 1.2 | Do. |
| Sulfur* | 2.75 | Do. |
| Zinc oxide master batch of ⅓ SBR-1502 and ⅔ zinc oxide* | 6 | Do. |

[1] Cold butadiene-styrene rubber.
[2] A precipitated hydrated silica of PPG Industries, Inc. having an ultimate particle size of 200 angstroms and a BET suface area of approximately 150 square meters per gram, and containing $SiO_2$—87.5%, CaO—0.75%, $R_2O_3$—0.95%, NaCl—1.6%; a weight loss at 105°C.
[3] Non-discoloring highly naphthenic hydrocarbon processing oil sold by Sinclair Refining Company.

The compounds I-A and I-B were then subjected to standard physical and stress-strain tests which are shown with the resulting data in Table II.

TABLE II

| Compound No. | I-A | I-B |
|---|---|---|
| Physical Data: | | |
| Rheometer at 300°F. (ASTM-D-2705): | | |
| 90% cure (minutes) | 24.5 | 18.0 |
| Minimum torque (inch-pounds) | 12.8 | 3.1 |
| Maximum torque (inch-pounds) | 91.5 | 41.3 |
| Mooney Scorch (ASTM-D-1646): | | |
| 270°F.—5 point rise ($T_5$) | | |
| Viscosity ($M_v$) | 43 | 18 |
| Scorch time (minutes) | 5.0 | 14.4 |
| Stress-Strain: | | |
| Tensile strength (p.s.i.): | | |
| 20 minutes cure at 300°F | 3440 | 2430 |
| 30 minutes cure at 300°F | 3560 | 2330 |
| 45 minutes cure at 300°F | 3270 | 2400 |
| 300% modulus (p.s.i.): | | |
| 20 minutes cure at 300°F | 1330 | 1320 |
| 30 minutes cure at 300°F | 1700 | 1390 |
| 45 minutes cure at 300°F | 1660 | 1340 |
| Elongation at break (percent): | | |
| 20 minutes cure at 300°F | 500 | 470 |
| 30 minutes cure at 300°F | 500 | 440 |
| 45 minutes cure at 300°F | 460 | 440 |
| Durometer: | | |
| 30 minutes cure at 300°F | 61 | 58 |

From the data reported in Table II, it can be seen that the siliceous-filled rubber vulcanizate has considerably higher tensile, modulus and elongation.

The following compounds of Example 2 demonstrate that a compound containing siliceous pigment as a reinforcing pigment (II-A) can be made to have the same tread wearing properties as carbon black-filled compounds. Compound II-A employed 70 parts siliceous pigment for reinforcement and one part of carbon black to serve as a pigment to provide a black tire.

EXAMPLE 2

Rubber compounds II-A through II-C were prepared according to the following formulations. The ingredients shown in Table I were mixed in a Banbury for about 5 minutes at a temperature of between 300° and 320° F.

TABLE III

| Rubber compounds | II-A | II-B | II-C |
|---|---|---|---|
| Ingredients (parts by weight): | | | |
| SBR-1712 (cold oil) masterbatch butadiene-styrene rubber | 66 | 68.75 | 65.75 |
| High cis content polybutadiene rubber | 50 | 50 | 50 |
| N-285 Black [1] | | 70 | 70 |
| Hi-Sil 233 [2] | 70 | | |
| S-300 [1] Black [3] | 1.0 | | |
| Mercaptopropyl trimethoxy-silane | 1.5 | 1.5 | |
| Carbpwax 4000 (Solid Glycol) | | | |
| Sundex 790 [4] (Aromatic Oil) | 26 | 26 | 26 |
| Zinc oxide | | 4 | |
| Stearic acid | 2 | 2 | 2 |
| Phenyl-beta naphthylamine | 1 | 1 | 1 |
| Flexamine G [5] | 1 | 1 | 1 |

[1] Standard ASTM designation.
[2] Trademark, PPG Industries, Inc.
[3] The carbon black was added to the silica-filled rubber for purposes of coloring the rubber.
[4] Trademark, Sun Oil Company.
[5] Trademark, United States Rubber Company. A physical mixture containing 65% of a complex diarylamine ketone reaction product and 35% of a commercial N,N'-diphenyl-p-phenylene diamine.

The rubber batch was further mixed on an open mill and the ingredients shown in Table II were added. The mixing on the mill was continued for about 10 minutes at 180° F.

TABLE IV

| | I-A | II-B | II-C |
|---|---|---|---|
| 2,2'-Benzothiazole disulfide | 1.5 | 0.7 | 0.7 |
| Diphenyl guanidine | 1.5 | .65 | .65 |
| Sulfur | 2.2 | 1.85 | 1.85 |
| Tetramethylthiuram disulfide | 0.2 | | |
| Zinc oxide master batch (containing ⅓ butadiene-styrene rubber and ⅔ zinc oxide) | 6 | | |

The resulting compounds had the following characteristics:

TABLE V

| Compound | 90% cure (min.) | 212°F. viscosity[1] ML 4' | Heat build-up[2] | Compression set[3] | Pico abrasion index[4] | Road wear index[5] |
|---|---|---|---|---|---|---|
| II-A | 12.0 | 52 | 85 | 13 | 88 | 126 |
| II-B | 19.0 | 55 | 139 | 22 | 106 | 122 |
| II-C | 21.0 | 48 | 142 | 24 | 114 | 123 |

[1] Tested according to ASTM D-1646.
[2] Tested according to ASTM D-623 method A.
[3] Tested according to ASTM D-395 method B.
[4] Tested according to ASTM D-2228-63T.
[5] Tested by Three-T Fleet, Inc., substantially as described in Patent No. 3,397,583. The results are accurate to within 5 points.

In determining the Road Wear Index, a tread band or portion was prepared of each of the rubber compounds II-A through II-C. The tread bands were applied to a new tire carcass. The tire cure included preheating the rubber compounds for 35 minutes at 210° F., then placing same in the mold for 17 minutes at 331° F. The tire was mounted on an automobile which was driven at 70 miles per hour on a hard-surfaced road for 4,400 miles. The road traveled was flat and included a combination of curved portions and straight portions. This test is designated as being a combination of slow and fast wear. The amount of tread lost during the test is determined and the Road Wear Index shows a comparison of the wear of each of the tread bands using an arbitrary standard of reference. The tire size was 7.35 by 14 inches. The load was 1,160 pounds on each tire. The tire was inflated to 32 pounds per square inch gauge.

From the data reported in Tables IV and V, it can be seen that the compound II-A containing siliceous pigment and a preferred silane coupling agent has desirably low heat build-up and a Road Wear Index equal to or slightly better than the carbon black-filled compounds II-B and II-C.

EXAMPLE 3

The following rubber compounds were prepared by mixing the ingredients shown in Table I (other than the ingredients marked by an asterisk which were added to the rubber mix on an open rubber mill) in a Banbury for about 5 minutes at a temperature of between 300° and 320° F.

TABLE VI

| Rubber compounds | III-A | III-B |
|---|---|---|
| Ingredients (parts by weight): | | |
| SBR-1502 (cold polymerized butadiene-styrene rubber) | 98 | 98 |
| N-285 Black [1] | | 60 |
| Hi-Sil [2] 233 | 60 | |
| S-300 [1] Black [3] | 1 | 1 |
| Sundex 790 [4] | 10 | 10 |
| Stearic acid | 2 | 2 |
| Phenyl-beta-naphthylamine | 1 | 1 |
| Flexamine G [5] | 1 | 1 |
| Mercaptoethylated polyethylene imine | 4 | 1 |
| 2,2'-Benzothiazole Disulfide* | 1.5 | 0.8 |
| Di-ortho-tolyguanidine* | 1.5 | .3 |
| Sulfur* | 2.75 | 1.85 |
| ZnO Master batch (⅓ butadienestyrene rubber and ⅔ zinc oxide)* | 6.0 | 6.0 |

[1] Standard ASTM designation.
[2] Trademark, PPG Industries, Inc. (supra).
[3] The carbon black was added to the silica-filled rubber for purposes of coloring the rubber.
[4] Trademark, Sun Oil Company for aromatic processing oil.
[5] Trademark, United States Rubber Company. A physical mixture containing 65% of a complex diarylamine ketone reaction product and 35% of a commercial N,N'-diphenyl-p-phenylene diamine.
*Added on open mill and mixed for about 10 minutes at 180°F.

The rubber compounds in Table VI were then subjected to various physical tests and the results are reported in the following Table VII:

TABLE VII

| Compound | 90% cure (min.) | 212°F. viscosity [1] ML 4' | Heat build-up [2] | Permanent set [2] | Pico abrasion index [3] | Road wear index [4] |
|---|---|---|---|---|---|---|
| III-A | 21 | 102 | 44 | 5.6 | 89 | 104 |
| III-B | 27 | 58 | 57 | 7.3 | 166 | 100 |

[1] Tested according to ASTM D-1646.
[2] Tested according to ASTM D-623 method A.
[3] Tested according to ASTM D-2228-63T.
[4] Tested by Three-T Fleet, Inc., substantially as described in Patent No. 3,397,583. The results are accurate to within 5 points.

From the data reported in Table VII, it can be seen that the siliceous pigment-filled composition III-A in which a preferred coupling agent was employed exhibits considerably lower heat build-up than the carbon black-filled composition III-B and in addition has the same or superior tire tread properties as exhibited by the Road Wear Index. No coupling agent was employed in compound III-B as the rubber properties of rubber vulcanizates in which carbon black is the reinforcing pigment are not improved by the use of a coupling agent.

The following example illustrates the superiority of a rubber compound reinforced with a finely divided siliceous pigment and employing a trialkoxysilyl olefin having an internal double bond and this rubber compound compared with a siliceous pigment reinforced rubber compound having no coupling agent.

EXAMPLE 4

The ingredients shown in Table VIII were mixed in a Banbury for about 5 minutes at a temperature between 300° and 320° F. Carbon black was added to both compounds for the purpose of coloring.

TABLE VIII

| Rubber compounds | IV-A | IV-B |
|---|---|---|
| Ingredients (parts by weight): | | |
| SBR-1502 [1] | 98 | 98 |
| Hi-Sil 233 [2] | 60 | 60 |
| Sundex 790 [3] | 10 | 10 |
| Stearic acid | 2 | 2 |
| Phenyl-beta-naphthylamine | 1 | 1 |
| Flexamine G [4] | 1 | 1 |
| S-300 Black [1] | 1 | 1 |
| 5-Triethoxysilylnorbornene | 2.4 | |

[1] Standard ASTM designation. Approximately .75 mole percent unsaturation.
[2] Trademark, PPG Industries, Inc. (supra).
[3] Trademark, Sun Oil Company. An aromatic oil.
[4] Trademark, United States Rubber Company. A physical mixture containing 65% of a complex diarylamine ketone reaction product and 35% of a commercial N,N'-diphenyl-p-phenylene diamine.

The rubber batch was further mixed on an open mill and the ingredients shown in Table II were added. The mixing on the mill was continued for about 10 minutes at 180° F.

TABLE IX

| | IV-A | IV-B |
|---|---|---|
| 2,2'-Benzothiazole disulfide | 1.5 | 1.5 |
| Di-ortho-tolylguanidine | 1.5 | 1.5 |
| Sulfur | 2.75 | 2.75 |
| ZnO Master (containing ⅓ SBR-1502 and ⅔ zinc oxide) | 6 | 6 |

The resulting compounds had the following characteristics:

TABLE X

| Compound | 90% cure (min.) | 212°F. Viscosity [1] ML 4' | Heat build-up [2] | Compression set [3] | Pico abrasion index [4] | Road wear index [5] |
|---|---|---|---|---|---|---|
| IV-A | 38.0 | 105 | 51 | 14 | 93 | 121 |
| IV-B | 41.0 | 168 | 88 | 25 | 94 | 100 |

[1] Tested according to ASTM D-1646.
[2] Tested according to ASTM D-623 Method A.
[3] Tested according to ASTM D-395 Method B.
[4] Tested according to ASTM D-2228-63T.
[5] Tested by Three-T Fleet, Inc., substantially as described in Patent No. 3,397,583. The results are accurate to within 5 points.

From the data in Table X, it can be seen that compounds IV-A has substantially improved characteristics for tire treads. The improved characteristics include cure time, viscosity, low heat build-up and improved road wear.

EXAMPLE 5

A tire tread having a tread wear indicator was prepared as follows: a F-78-X-15 fiberglass belted tire was buffed to remove the tread and tread sections built on it from sheets of tread rubber both black and white with the white layers disposed beneath the surface of the tread. Five sheets of tread rubber were employed. The bottom sheet was 1/16 inch thick and white. The adjacent sheet was 2/16 inch thick and white. The next two sheets were 2/16 inch thick and black and the surface sheet was 3/16 inch thick and black. The white sheets were the compound I-A and the black sheets were the commercial rubber of compound I-B both described in Example 1. The tread sheets were brushed with normal hexane in order to cause them to adhere to each other prior to vulcanization and the plies were rolled by hand on to the tire carcass with a 2-inch diameter roller. The tread sheets were laid on the tire in a valley die which provided a shoulder depth of 14/32 inch and a depth in the center of the tread of 10/32 inch. The width of the tread at the bottom was 7 ¾ inch. The width of the tread at the top was 5 ¼ inch and the width of the tread wear indicator was 4 ½ inch. The composite was then vulcanized in a standard tire mold for 60 minutes at 300° F. The mean distance of the topmost portion of the white rubber to the tread surface was 5.815 millimeters or 0.229 inch with a standard deviation of 0.27 millimeter or 0.01 inch. Thus, such a tire when worn to 0.229 inch would expose the white layer.

Although the present invention has been described with reference to the specific details and particular embodiments thereof, it is not intended thereby to limit the scope of the invention except insofar as the specific details are recited in the appended claims.

I claim:

1. In a tire comprising a carcass and a tread portion secured to the carcass, said tread having a plurality of tread grooves, the improvement which comprises a tread having a surface portion of a first color and a sub-surface portion of a contrasting color, the sub-surface portion being at least 1/16 inch above the bottom of the tread groove, and wherein one of the said surface portion and sub-surface portion of the tread is carbon black-reinforced rubber and the other comprises the vulcanizate of reinforcing siliceous pigment, curable rubber and coupling agent which bonds the curable rubber to the siliceous pigment, said coupling agent being selected from trialkoxysilyl olefins, mercaptoalkylate polyamines and mercaptoalkyl trialkoxysilanes.

2. The tire of claim 1 wherein the surface portion of the tread is black.

3. The tire of claim 1 wherein the surface portion of the tread is carbon black reinforced rubber.

4. The tire of claim 1 wherein the vulcanizate comprises from 5 to 100 parts of reinforcing siliceous pigment and from 0.1 to 15 parts of coupling agent per 100 parts of curable rubber.

5. The tire of claim 4 wherein the coupling agent is 5-triethoxysilylnorbornene, mercaptoethylated polyethyleneimine, mercaptopropyl trimethoxysilane or mercaptopropyl triethoxysilane.

6. The tire of claim 5 wherein the vulcanizate comprises from 40 to 90 parts of reinforcing siliceous pigment and from 0.3 to 3 parts of coupling agent per 100 parts of curable rubber.

7. The tire of claim 4 wherein the curable rubber is styrene-butadiene rubber, butadiene rubber, ethylene-propylene-diene rubber or natural rubber.

8. The tire of claim 1 wherein the sub-surface portion is between 2/16 and 5/16 inch thick.

9. The tire of claim 1 wherein the sub-surface portion is from 1/16 to 3/32 inch above the bottom of the tread groove.

10. In a tire comprising a carcass and a tread portion secured to the carcass, said tread having a plurality of grooves, the improvement which comprises a tread having a surface portion of carbon black-reinforced rubber and a sub-surface portion of a contrasting color, the sub-surface portion being at least 1/16 inch above the tread groove to thereby form a tread wear indicator, the sub-surface portion of the tread comprising the vulcanizate of from 5 to 100 parts of reinforcing siliceous pigment and 0.1 to 15 parts of coupling agent per 100 parts of curable rubber selected from styrene-butadiene rubber, butadiene rubber, ethylene-propylene diene rubber and natural rubber, the coupling agent being selected from trialkoxysilyl olefins, mercaptoalkylated polyamines and mercaptoalkyl trialkoxy silanes.

11. The tire of claim 10 wherein the vulcanizate comprises from 40 to 90 parts of reinforcing siliceous pigment and from 0.3 to 3 parts of coupling agent per 100 parts of curable rubber.

12. The tire of claim 10 wherein the coupling agent is 5-triethoxysilylnorbornene, mercaptoethylated polyethyleneimine, mercaptopropyl trimethoxysilane or mercaptopropyl triethoxysilane.

* * * * *